UNITED STATES PATENT OFFICE.

MEINHARD HOFFMANN AND ARTHUR WEINBERG, OF MAINKUR, NEAR FRANKFORT-ON-THE-MAIN, ASSIGNORS TO LEOPOLD CASSELLA & CO., OF FRANKFORT-ON-THE-MAIN, GERMANY.

NAPHTHOL-BLACK COLOR COMPOUND.

SPECIFICATION forming part of Letters Patent No. 345,901, dated July 20, 1886.

Application filed August 14, 1885. Serial No. 174,407. (Specimens.)

*To all whom it may concern:*

Be it known that we, MEINHARD HOFFMANN and ARTHUR WEINBERG, both residing in Mainkur, near Frankfort-on-the-Main, Germany, have invented certain new and useful Improvements in Coloring-Matters, of which the following specification is a full description.

The present invention relates to a new method for manufacturing blue to violet coloring-matters belonging to the azo group.

We take one of the compounds corresponding to the general formula, $R\ (SO_3H)_x\text{—}N\text{=}N\text{—}C_{10}H_6NH_2\ (a)$ obtained by the reaction of diazosulphonic acids upon alpha-naphthylamine and convert it into the diazo-azo compound with the necessary quantity of nitrous acid. This diazo-azo compound is then allowed to react upon naphthol or naphthol sulphonic acids in an alkaline solution.

As an example we shall describe the process of carrying out the manufacture of the dark-blue azo coloring-matter, which we call "naphthol-black." We dissolve thirty-five kilograms naphthylamine disulphonate of sodium in three hundred litres of water acidulated with thirty kilograms of muriatic acid, twenty-one degrees Baumé and diazotize by addition of seven kilograms of nitrate of sodium in aqueous solution at a low temperature. Thereupon eighteen kilograms of chlorhydrate of alpha-naphthylamine dissolved in five hundred litres of water are poured into the above mixture while constantly stirring. The diazo-azo compound thus formed is allowed to act upon a solution of thirty-six kilograms of beta-naphthol-alpha-disulphonate of sodium (salt R) kept alkaline by addition of twenty kilograms ammonia of twenty per cent. The immediately-formed coloring-matter separates completely by addition of common salt. It is then filtered, and is delivered to the trade as a black paste or in solid form.

Naphthol-black produces on the fiber in an acidulated bath dark-blue shades. It is very soluble in water, insoluble in spirit, and dissolves in strong sulphuric acid with green color. Reducing agents destroy the color-forming alpha-naphthylamine besides other products.

We claim—

As a new product, the herein-described dye-stuff or coloring-matter of a black color and capable of dyeing shades of dark blue, as set forth.

In testimony whereof we have signed our names to this specification in the presence of two subscribing witnesses.

MEINHARD HOFFMANN.
  ARTHUR WEINBERG.

Witnesses:
 ALVESTO S. HOGUE,
 JEAN GRUND.